United States Patent [19]

Dodd et al.

[11] 3,931,645

[45] Jan. 6, 1976

[54] FLEXIBLE DISK STORAGE APPARATUS HAVING DISKS OF VARIOUS RADII FOR ENHANCING AXIAL DISK LOCATION

[75] Inventors: Paul D. Dodd, Boulder; Donald E. Griffiths, Longmont, both of Colo.

[73] Assignee: International Business Machines Corporation, Armonk, N.Y.

[22] Filed: Aug. 29, 1974

[21] Appl. No.: 501,738

[52] U.S. Cl. .................... 360/135; 360/75; 360/98; 360/99
[51] Int. Cl.² G11B 5/82; G11B 21/02; G11B 5/016; G11B 5/012
[58] Field of Search ............... 360/98, 99, 133, 135

[56] References Cited
UNITED STATES PATENTS 3,852,820  12/1974  Barbeau et al........................ 360/99

*Primary Examiner*—Robert S. Tupper
*Attorney, Agent, or Firm*—Herbert F. Somermeyer

[57] ABSTRACT

A flexible disk file signal storage apparatus has a multiplicity of relatively thin, flexible disks of varying radii and arranged axially to facilitate radial disk selection. The radii pattern tends to minimize radii differences, thereby enhancing storage capacity. The flexible disks are arranged in axial groups of more than three disks with at least one disk in each group having a minimum radius with a pair of outer disks with a maximum radius plus at least one intermediate diameter disk. By interleaving alternate ones of said minimum radius disks between intermediate and maximum radius disks, radial selection access ports are maximized along an axial direction for a given radial difference between the maximum and minimum disk radii.

11 Claims, 15 Drawing Figures

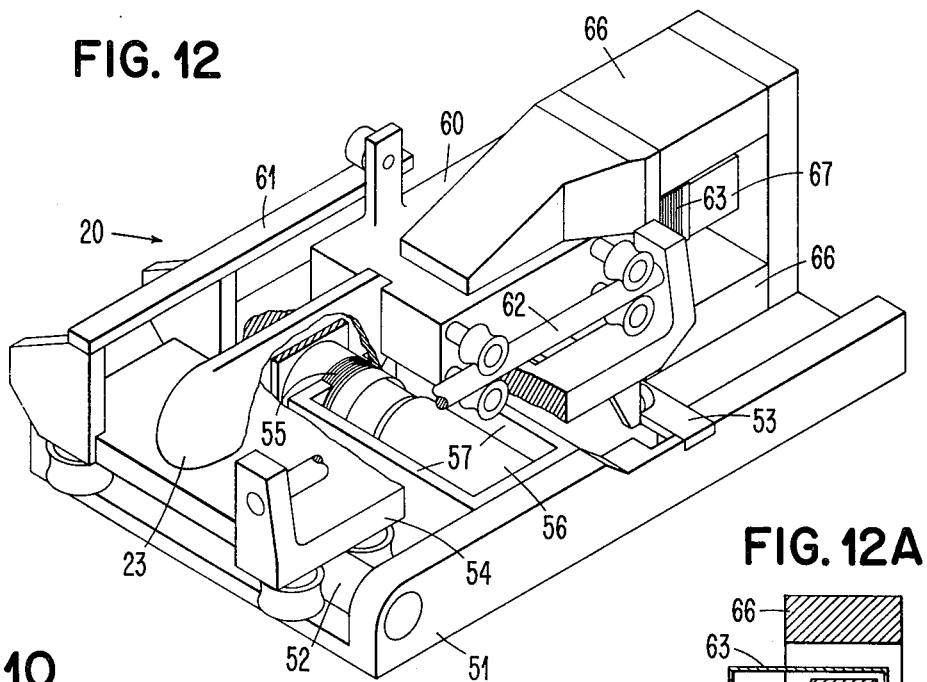
FIG. 12
FIG. 12A
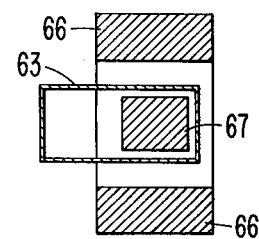
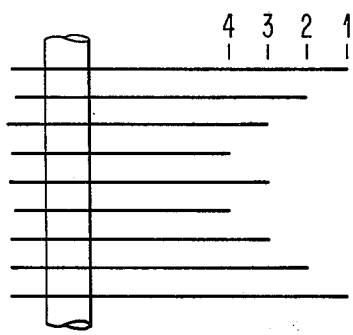
FIG. 10
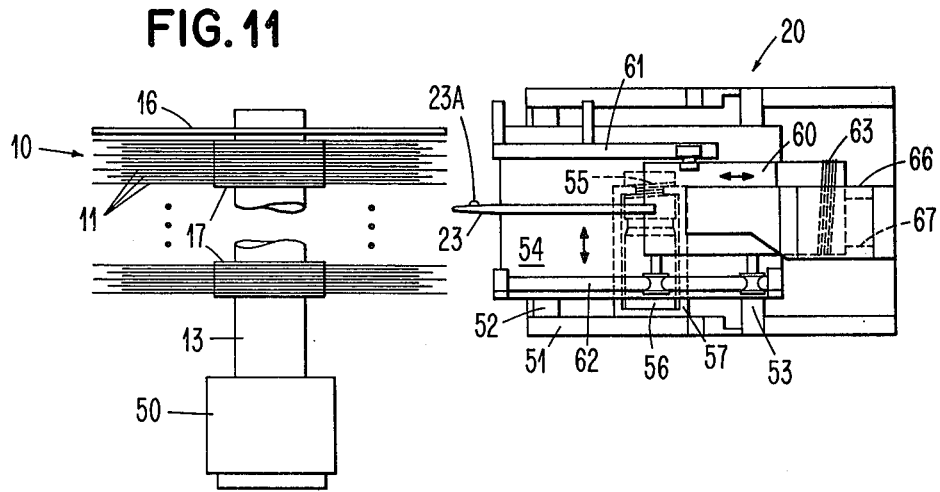
FIG. 11

FLEXIBLE DISK STORAGE APPARATUS HAVING DISKS OF VARIOUS RADII FOR ENHANCING AXIAL DISK LOCATION

BACKGROUND OF THE INVENTION

This invention relates to rotating magnetic memories.

Rotating magnetic members used as storage media are well known in the form of magnetic drums, magnetic disks, magnetic strips, and flexible magnetic disks. The latter category of rotating magnetic memories offers enhanced volumetric efficiency in the storage of signals; that is, the number of disks stored in a given volumetric unit appears to be a maximal when used with such flexible magnetic disks. Such flexible magnetic disks preferably have a relatively thin, axial dimension in the order of magnitude from 0.0010, or 0.005 inch. It is also preferred, for stabilization purposes, that such disks be axially spaced apart a small distance, such as one-half mil to ten mils, with radial air flow being circumferentially uniformly distributed for stabilizing the individual disks during rotation.

The assembly of such disks is referred to as a flexible disk pack assembly. Each of the disks has at least on record signal receiving portion, such as a magnetic coating. In other embodiments, each disk may have two surfaces for receiving signals. One problem in using such a flexible disk pack assembly is to access such record surface portions in a precise, rapid, and repeatable manner. To position an accessing mechanism between two disks spaced apart on a center-to-center basis of 0.015 inch or less requires accurate positioning devices. Further, because of thermal instabilities in any large apparatus, such as one employing 250 or more such flexible disks, plus tolerance build-up from one end of the pack to the other, it is exceedingly difficult to rapidly locate any selected disks for accessing a given record surface portion.

One solution to the axial positioning problem is shown by Lynott and Masterson in the IBM TECHNICAL DISCLOSURE BULLETIN, Vol. 12, No. 1, June 1969, on Page 81, entitled "Disk Memory." Lynott and Masterson teach that by varying the diameter of the various disks, selection of a given disk is enhanced. According to Lynott and Masterson, one disk has a maximum radius with all of the other disks having succeedingly reduced radii to a minumum radius disk. While this enhances selection, it requires that the disk have a significant change in diameter; hence, the recording surface available for receiving signals on a volumetric basis is not maximized, i.e., the recording surface on the minimum radius disk, when using a large number of disks, is substantially less than a maximum radius disk. Also, the number of indexing points, i.e., for ten disk packs, there are ten different radii, requires ten different radial positions of the accessing mechanism. This complicates the control of an accessing mechanism and, hence, increases cost.

It is desired that a flexible disk pack be constructed such that accessing is enhanced without providing a great difference in radii of the various disk record members.

SUMMARY OF THE INVENTION

The present invention provides an enhancement of flexible disk file rotating magnetic memories. This enhancement is particularly directed toward facilitating rapid access to any one of a plurality of such disks while maintaining high volumetric storage efficiency.

A flexible disk assembly includes a center support supporting a multiplicity of coaxially disposed flexible disk records. Such disks are grouped into a plurality of groups of such disks greater than three, wherein each of the groups is bounded by two disks having a maximum radius with at least two of the disks in each group having a minimum radius, and at least one additional disk having an intermediate radius interposed between such minimum radius disks. In a preferred form of the invention, a minimum radius disk is axially interleaved between other disks of intermediate and maximum radii.

The accessing of a record portion on such disk is by a so-called "weave" set of motions consisting of an initial axial motion to position between an accessing mechanism between said two maximum radius disks. Then, the accessing mechanism is moved to a radial position inward of the maximum radius disk, but radially outward of the next radius disk. Then, an axial motion pushing one of the maximum radius disks is employed followed by an intermediate radial motion and a subsequent axial motion all in accordance with the position of the disk to be selected within such group of disks.

The foregoing and other objects, features, and advantages of the invention will become apparent from the following more particular description of the preferred embodiment, as illustrated in the accompanying drawing.

THE DRAWING

FIG. 10 is a fourth radial pattern in accordance with the present invention.

FIG. 11 is a diagrammatic showing of a disk pack assembly together with an accessing means.

FIG. 12 is a simplified perspective diagrammatic showing of a two-dimensional actuator usable with the FIG. 11 illustrated apparatus.

FIG. 12A is a diagrammatic showing of the FIG. 12 radially acting coil to flux return path relationship.

DETAILED DESCRIPTION

Figure 1:
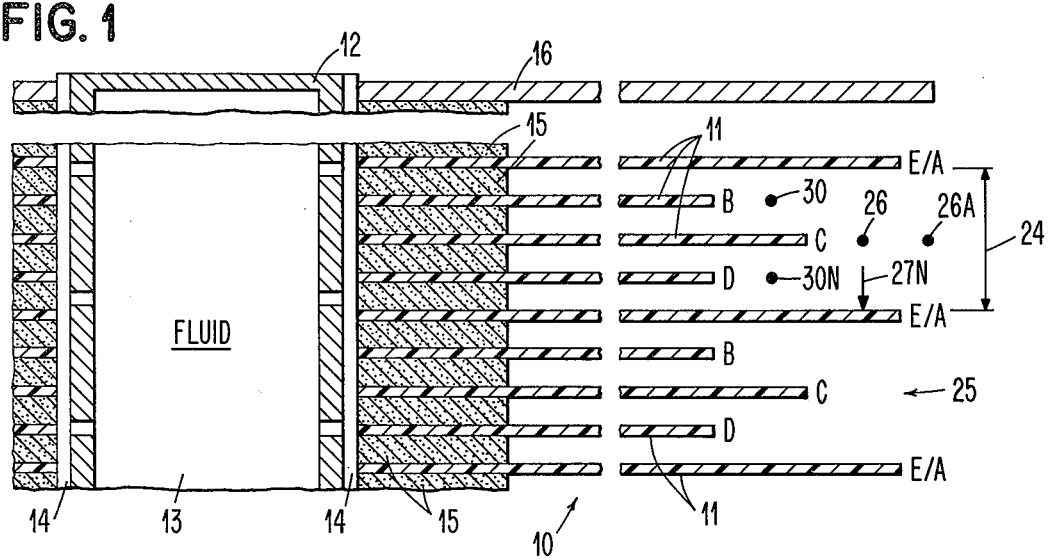
FIG. 1 is a partial diagrammatic side view of apparatus employing the invention, particularly showing a preferred pattern of varying radii flexible record disks for enhancing disk selection while minimizing radii differences between the various disks.

With reference to the appended drawings, like numerals indicate like parts and structural features in the various views and diagrams. Disk pack assembly 10 includes a multiplicity of record storage disks 11, each having at least one record surface portion for receiving signals to be recorded, such as is known in the art. The recording circuits and transducers may be of conventional design. All of the flexible record disks 11 are coaxially disposed and supported by central rotatable hub 12 having axially extending fluid communication passageway 13. The fluid, such as air, is pumped through axially extending passageway 13 and then moved through axially extending slots 14 for release through air permeable washers 15, and thence radially outwardly intermediate record disks 11. Such air flow is preferably uniformly circumferentially distributed for stabilizing the record members during rotation. An additional stabilizing rigid backing plate 16 is disposed at one end of the disk pack assembly. The other axial end of the disk pack assembly may have semi-rigid retainer rings 17 (FIG. 11) for further stabilizing the assembly during rotation.

Disks 11 are grouped into repetitive sets of radii. In the preferred form, five disks are in each group; and outer disks in each group are in two adjacent disk groups. In FIG. 1, disks A-E are in each group with the shared disks labeled E/A. Disks E/A are maximum radius disks, disks B and D are minimum radius disks; while C have an intermediate radius. Such varying radii create axial extending radial accessing port or window 24 for disks E/A, B-D, which cooperate with later-described accessing means and controls to access a record surface portion in such group in a rapid, repeatable manner.

Figure 2:
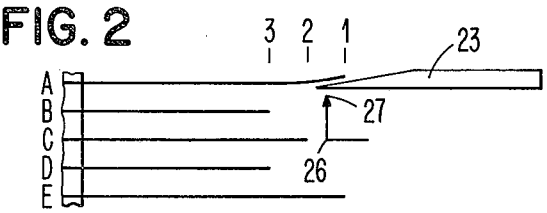
FIGS. 2–7 are simplified diagrammatic showings of some disk selection procedures of the present invention.
Figure 3:
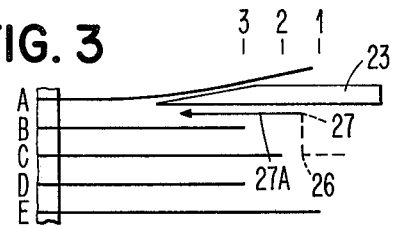

Accessing means 20 (FIG. 11) includes an axially moving carriage 54 which carries a radially movable carriage 22 having an accessing partitioning arm 23 in the shape of an air foil. Arm 23 preferably carries transducer 23A. A control circuit first axially positions carriage 54 adjacent a predetermined group of flexible disks. Such axial positioning may be a voice coil having a linear tachometer or be a precision lead screw which has an accuracy sufficient to position the arm in an accessing window 24 (FIG. 1) between the facing surfaces of two adjacent maximum radius disks E/A, the upper disk being disk A for the group adjacent window 24, while the lower disk is disk E for such group and is shared with group 25 as disk A. As carriage 54 is positioned with arm 23 in window 24, the radial carriage moves radially inwardly between disks A and E of group 24 as to point 26, as shown in FIGS. 1 and 2. Next, axial carriage 21 again moves arm 23 to deflect disk A of group 24 as shown in FIG. 2. Then, to access the record surface portion of disk A, arm 23 is inserted from intermediate axially offset position 27 to be in transducing engagement with the disk A recording surface (FIG. 3). As accessor arm 23 axially separates disks A and B, several adjacent disks are also compliantly axially urged. This action is also referred to as disk pack splitting.

Figure 4:
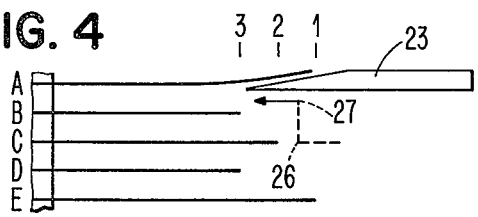
Figure 6:
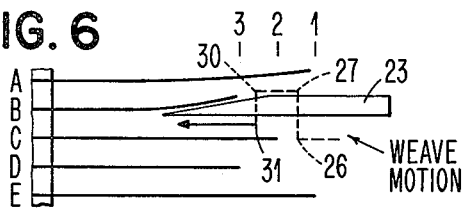
Figure 5:
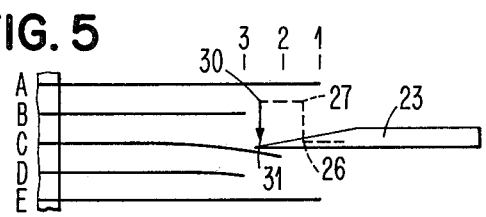

In a similar manner, any of the disks within a group of such disks can be accessed. Referring to FIGS. 4 and 5, disk B, a minimum radius disk axially interposed between disks A and C, is accessed as shown in FIGS. 4 and 5. As for accessing disk B, arm 23 first moves to position 26, then 27; however, instead of radially inwardly moving as shown in FIG. 3, arm 23 moves between disks A and C, radially outward of disk B, such as at position 30. Then, arm 23 moves axially to position 31 whereat it deflects disk C. Then, arm 23 moves radially inwardly to engage disk B in transducing engagement as shown in FIG. 6.

Figure 7:
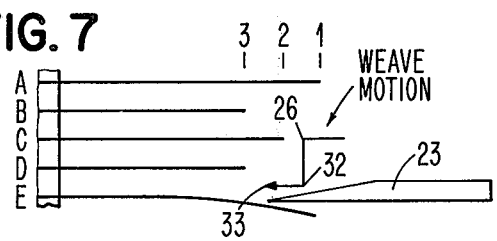

Referring next to diagrammatic FIG. 7, accessing the record surface portion of disk D is illustrated. Accessor arm 23 is moved radially to position 26 as in all other radial accessing motions. Instead of moving to the right to position 27, as shown in FIGS. 2–6, accessor arm 23 moves to the left or downwardly to position 32 deflecting lowered maximum radius disk E as shown. Following deflection of disk E, accessor arm 23 moves radially inwardly to position 33 interleaved between disks D and E for accessing the record surface portion of disk D. Disk E record surface portion is accessed in the next adjacent group of record disks, as shown for disk A in FIGS. 2 and 3. In the event that record surface portions are on both sides of each disk A–E, then each of the above-described radially accessing motions accesses both of the facing record surface portions; i.e., in FIG. 6, the facing record surface portions on disks B and C are simultaneously accessed. In such a situation, transducer 23A is replaced by a pair of outwardly facing transducers on arm 23 for transducing engagement with adjacent spaced-apart disks.

Figure 8:
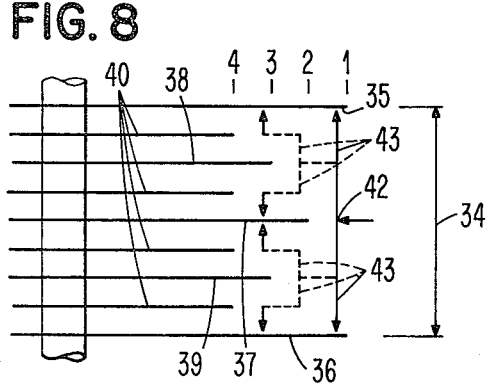
FIG. 8 is a diagrammatic showing of a flexible disk pack assembly using the invention with a more complex radial pattern than that employed in the FIG. 1 showing, together with a diagrammtic weave pattern usable for disk selection.

Referring next to FIG. 8, a variation of the inventive disk arrangement is shown which increases the axial length of the accessing window. Rather than three different radii disks, four different radii disks are used. Each group of disks of the FIG. 8 illustrated embodiment includes a pair of maximum radius disks 35 and 36, one intermediate radius disk 37, two lesser intermediate radius disks 38 and 39, and four minimum radius disks 40. As in the FIG. 1 illustrated embodiment, a minimum radius disk 40 is interleaved between two adjacent disks having a greater radius. Another aspect of both the FIGS. 1 and 8 illustrated embodiments is that each disks within a group of disks is immediately adjacent and interleaved between two disks having a radius different than its own radius.

The radial accessing weave motions for accessing given disk surfaces in the FIG. 8 embodiment are similar to those illustrated in FIGS. 2–7 for the FIG. 1 illustrated embodiment. To access a disk, an accessor arm (not shown) moves from any position within axial window 34 to a first radial position 42; radially inward of the outer periphery of disks 35 and 36 and radially outward of first intermediate disk 37. Depending on which disk is to be accessed, an axial motion either toward disk 35 or 36 selects the axial window, respectively, between disks 35 and 37 or between disks 37 and 36. Such motion is represented by the vertical lines 43. To select a disk 40 between disks 35 and 38, access arm moves toward disk 35, then radially inwardly between disks 35 and 37, then axially toward disk 35, radially inwardly between disks 38 and 35, then axially deflecting disk 38, and finally radially inwardly between disks 38 and 40 (disk 40 between disks 35 and 38). Upon inspection of the figure, it can be seen that the inventive weave motion can be used to select any one of the disks 35 or 40 by such weave motions only by initially locating the outermost actual window 34 by means beyond the scope of the present invention and then utilizing the invention to locate radially inwardly positioned windows of lesser axial extent by the succession of radial and axial motions while deflecting the various radii disks for rapidly and unerringly moving accessor arm 23 to a selected disk record surface portion.

Figure 9:
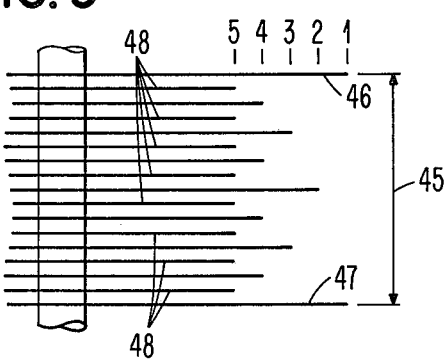
FIG. 9 is yet another radial pattern variation using the present invention, but not minimizing the radial differences as provided in the FIG. 1 illustrated embodiment.

In a similar manner, a five radial difference disk assembly may be provided such as shown in FIG. 9 where the maximum radius disks are indicated by the numeral 1 and the minimum radius disks are indicated by the numeral 5. An axial accessing window is provided between the maximum radius disks 46 and 47. While the FIG. 9 illustrated embodiment is less efficient in providing a maximum axial length window 45 for a minimum difference in radius between the maximum and minimum radius disks, the principles of the present invention are still employed.

FIG. 10 shows another embodiment of the invention employing four different radii in a disk. In the FIG. 8 embodiment, there are nine disks for four radii; while in the FIG. 10 embodiment, there are also nine disks provided, however, the second level window at the numeral 2 is of lesser axial extent requiring precise positioning between the two disks at this radius. Hence, the FIG. 10 embodiment requires more precise axial positioning for reliable accessing than required in the other illustrated embodiments.

Referring next to FIGS. 11 and 12, a diagrammatic showing of an apparatus employing the present invention is illustrated. Disk pack assembly 10 consists of rigid plate 16 with a large plurality of interposed flexible record disk members 11 and, optionally, stiffening washers 17; all of which are coaxially mounted for rotation on shaft 13 of electric motor 50. An axial positioning mechanism 60 are disposed at the outer periphery of disk pack assembly 10 has a base 51 stationarily mounted with respect to motor 50. A pair of carriage support rods 52 and 53 extends in parallel relationship to axle 13. Carriage 54, movably mounted on rods 52 and 53, is actuated for axial movement by voice coil 55 disposed about magnet path 56 of a permanent magnet 57. A magnetic yoke 58 completes the magnetic circuit. Electronic circuits for actuating coil 55 for moving carriage 54 are well known and are not further described with respect to FIG. 11. It is sufficient to say that an accurate positioning mechanism is provided by using known voice coil techniques.

Carriage 54 also carries radially movable carriage 50 disposed on radially extending guideways 61 and 62. These guideways are parallel with base plate 51. A second voice coil 63, mounted on carriage 60, is responsive to electrical circuits (not shown) for moving carriage 60 radially inwardly and outwardly in accordance with known voice coil actuator techniques. Voice coil 63 is continually under the influence of a magnetiic field provided by axially and radially extending permanent magnet assembly 66 which has an axial length greater than the axial stroke of axial movable carriage 54. As best seen in FIG. 12A, flux return path member 67, stationarily mounted on magnet assembly 66, has an axial width less than the inside axial length of coil 63; thereby permitting axial movement of coil 63 without corresponding motion of return path member 67.

Figure 13:
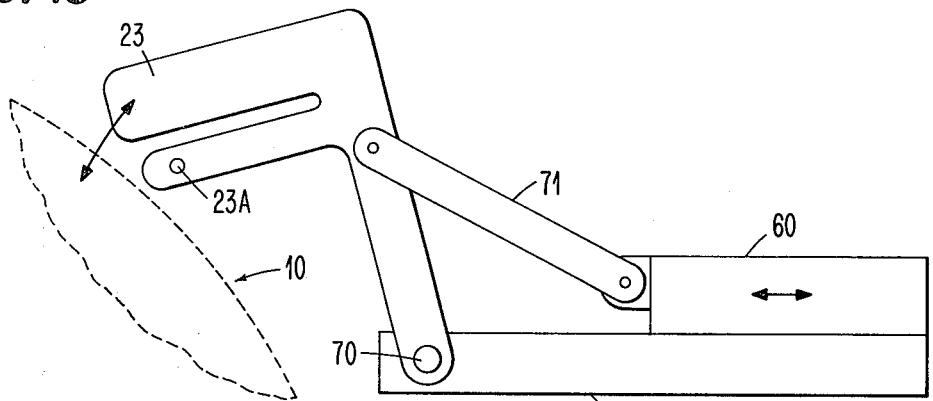
FIG. 13 is a diagrammatic showing of an acuator usable to move an accessing blade into a disk pack assembly using an arcuate motion.

As shown in FIG. 11, arm 23 is moved on a radius of disk pack assembly 10. In certain instances, it may be advantageous to move arm 23 in an arcuate manner for achieving more efficient pack splitting. In this regard, FIG. 13 illustrates a modification of the FIG. 11 illustrated accessing mechanism. Radial carriage 60 on axial carriage 54 is disposed radially outwardly of pack 10. Adjacent pack 10 on axial carriage 54 is upstanding boss 70 pivotably mounting accessor arm 23. Connector rod 71 extends between radial carriage 60 and accessor arm 23 for imparting pivoting motions thereto in accordance with the radial motions of carriage 60. Transducer 23A, in the illustrated embodiment, is shown displaced from the pack splitting arm 23. The FIG. 13 accessor arm arrangement is also used in the FIG. 11 embodiment. No limitation of the invention is intended to the particular accessor arm configuration.

Figure 14:
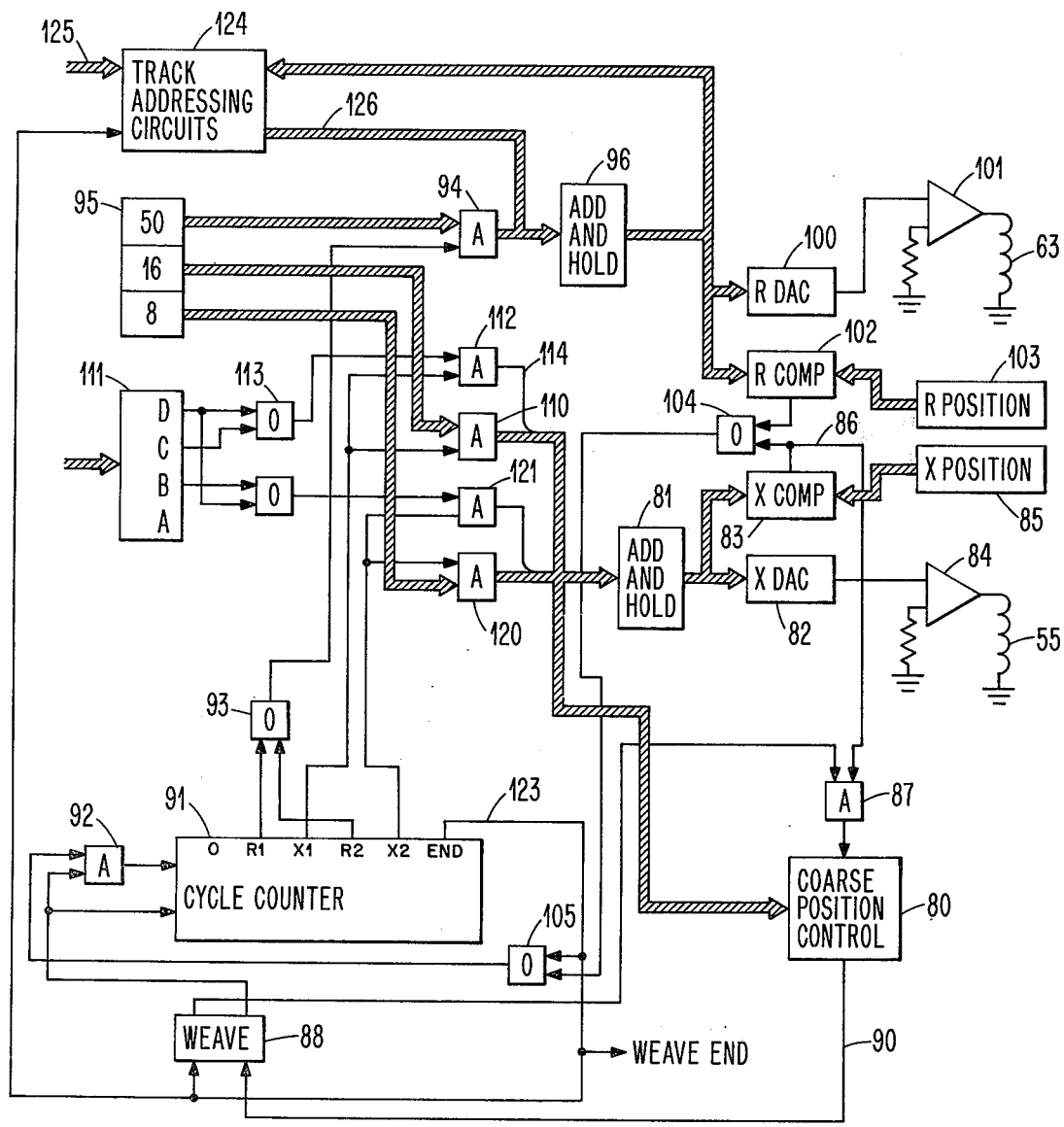
FIG. 14 is a simplified schematic diagram of control means usable with the present invention to achieve the weave accessing motions.

FIG. 14 illustrates control circuits for accomplishing the disk pack weave accessing motions described with respect to FIGS. 1–10. For simplifying the discussion, access to single record surface disks A–D of one group is described. The record surface portion is on the under side of the disk, as shown in FIG. 1. Positioning of accessing arm 23 in window 24 can be by a lead screw (not shown), the axial carriage drive mechanism shown in FIGS. 11 and 12, or any other linear positioning apparatus. A lead screw enables a greater axial length to pack 10 than is enabled by using the FIG. 11 illustrated apparatus. When axial window 24 has a sufficient axial length, positioning accessing arm 23 can be accomplished without reference to the actual location of maximum radius disks E/A. On the other hand, such axial length of window 24 may not permit such openended positioning. In such a case, maximum radius disks E/A are counted; or, in the alternative, precisely located with respect to positioning apparatus (not shown) in the FIGS. 11 and 12 apparatus for positioning accessor arm 23 in window 24. Such apparatus is beyond the scope of the present description. In any event, coarse position control 80 first axially positions accessing arm 23 in window 24.

For controlling axial positioning arm 23 using the voice coil techniques, a servomechanism drives axially acting voice coil 55. In this regard, coarse position control 80 supplies the address of the window 24, i.e., the axial (or X) address corresponding to disk C adjacent window 24 (FIG. 1), to add and hold circuit 81 (an arithmetic accumulator). Add and hold circuit 81, having been previously cleared using known techniques, supplies the received address to X (axial) digital-to-analog converter (XDAC) 82 and to the X or axial compare circuit (XCOMP) 83. XDAC 82 actuates servo system 84 to supply drive current through coil 55 for positioning axial carriage 21 adjacent window 24. X position sensing system 85 is suitably mounted on base 51 and indicates to XCOMP 83 the axial position of axial carriage 54. When the desired address in circuit 81 equals the X position address indicated by circuit 85, X compare 83 supplies a "move complete" signal over line 86 to coarse position control 80 via AND 87. AND 87 passes the move complete signal only when flip-flop 88 indicates a weave operation is not being performed. Coarse position control 80 responds to the move complete signal to initiate a weave pack accessing operation by sending a start weave signal over line 90. This signal sets weave flip-flop 88 to the active condition. This action disables AND 87 and simultaneously initiates the weave operation by triggering cycle counter 91 from the zero or reference state to the R1 state and also enables AND circuit 92 to pass subsequent move complete signals for stepping cycle counter 91, as will become apparent.

The first motion in the weave within window 24 radially moves accessor arm 23 to position 26 circumferentially intermediate the E/A disks of the group being accessed and radially outward of the center disk C. The R1 cycle counter state indicating signal passes through OR circuit 93 to actuate AND's 94 to pass a count of 50 from constants register 95 to add and hold circuit 96. Circuit 96 actuates radial servomechanism for coil 63. The constant 50 indicates that accessing arm 63 moves to position 26 from the initial or home position 26A (FIG. 1). In this regard, add and hold circuit 96, having previously been cleared, contains the 50-mil desired radial address and supplies same to RDAC (radial digital-to-analog converter) 100 which, in turn, drives analog servo circuit 101 to supply suitable actuating current to radial-acting voice coil 63. Simultaneously, the same address is supplied to the radial compare circuit (RCOMP) 102, which compares the actual radial position as supplied by R position circuit 103 with the desired radial position. When equal, the move is completed to position 26; then, RCOMP 102 supplies a move complete signal through OR 104 and OR 105 to AND 92. AND 92 having been enabled by weave flip-flop 88 passes the move complete signal stepping cycle counter 91 to the XI state.

Cycle counter 91 being in the XI state selects the next axial movement in the weave motion. For example, as shown in FIG. 2, it will be moving accessing arm 23 from position 26 to position 27 (in the alternative, in the opposite axial direction). In an early constructed embodiment, such axial motions were 16 mils. Accordingly, a 16 constant digital value from constants register 95 passes through AND's 110 to add and hold circuit 81. This value is absolute magnitude and is added to the present axial address in 81 using known arithmetic techniques.

To select surface A, accessor 23 moves in the plus direction; while if surface C or D is to be accessed, arm 23 moves in the negative direction (downwardly, as shown in FIGS. 1 and 2). Accordingly, prior to initiating the weave operation, the surface to be accesssed is identified in surface indicating register 111 as being surface A, B, C, or D. Using 1's complement numerical notation, a positive motion to location 26 is indicated by a zero or positive sign; a negative motion is indicated by a binary one or negative sign. Since zero is represented by the absence of a pulse on a sign indicating line, no sign action need be taken for indicating a positive motion.

For a negative motion, AND circuit 112 jointly responds to the XI signal state of cycle counter 91 and to the C or D surface being selected, as indicated by a signal passed through OR 113, to supply a one indicating (negative sign) signal over line 114 to add and hold circuit 81. This negative sign causes the magnitude 16 from constants register 95 to be subtracted from the present address in add and hold 81. Hence, the desired address supplied from add and hold 81 to XDAC 82 has been changed. Analog circuit 84 then supplies a correspondingly changed current to voice call 55, moving the axial carriage downwardly, as shown in FIG. 11, i.e., toward the home position at the bottom of the pack. This action moves accessor arm 23 downwardly against the lower E/A disk of window 24 indicated by arrow 27N.

When the new axial address (either positive or negative) has been reached by the axial carriage, a move complete signal on line 86 is blocked by closed AND 87, but passes through OR's 104 and 105, thence AND 92 to step cycle counter 91 to the R2 signal indicating state.

With the preferred weave motion, all accesses use a second radial motion of 50 mils to a next radially inward position, as indicated by arrow 27A of FIG. 3 and position 30 or 30N in FIGS. 5 and 6. Position 30 is between disks C and E/A of FIG. 1, while a negative motion 27N results in accessor arm being at position 30N between disks C and lower E/A of window 24. The 0.050 inch motion is accomplished in the same manner as described for the R1 signal state; i.e., AND 94 passes a constant 50 from constants register 95 to circuit 100.

Upon completion of the radial move above described, the cycle counter 91 steps to the X2 state for selecting either disk A or B, or disk C or D, in accordance with the initial weave motion. In the constructed embodiment, an axial motion ± 0.008 inch selects a disk. Accordingly, constant 8 from constants register 95 passes through AND's 120 (enabled by the X2 signal state) to add and hold circuit 81. For positive motion upwardly in FIG. 11, no sign activity is provided. For a negative or downward motion, AND circuit 121 jointly responds to the X2 signal state and the BD signal state of surface selecting indicating register 111. The BD signal actuates circuit 81 to subtract eight mils from its accumulated axial address. The X or axial motion is then accomplished as aforedescribed for the X1 signal state. Upon completion of that motion, a move complete signal steps cycle counter 91 to the N signal state.

The N signal state supplies a "weave-end" signal over line 123 to other control circuits (not shown) for indicating the weave-end status of the accessing mechanism plus stepping cycle counter 91 to the zero or reference state. In the reference state, no action occurs in the illustrated apparatus. Also, weave-end signal enables track accessing circuits 124 to respond to track addresses, i.e., radial positions received from control circuits (not shown) over cable 125, for example. Track accessing circuits supply delta radial addresses over cable 126 to add and hold circuit 96. The present desired address residing in add and hold circuit 96 travels over cable 127 to track accessing circuits for enabling circuits 124 to compare addresses received over cable 125 with the circuit 96 present address for calculating delta addresses.

The FIG. 14 illustrated circuits enable access to disks having but one record surface portion. Similar circuits can be designed using the principles above stated for accessing disks having two surfaces, as well as having different radial configurations, such as illustrated in FIGS. 8–10. Depending upon the logic circuits used to implement the control of the weave, various configurations and logic choices are available to the designer.

While the invention has been particularly shown and described with reference to a preferred embodiment therein, it will be understood by those skilled in the art that various changes in form and detail may be made therein without deparing from the spirit and scope of the invention.

What is claimed is:

1. A flexible disk assembly, including in combination:
a center support;
a plurality of flexible record indicia type disk members of various radii coaxially disposed on said support in at least one group of a plurality of such disks; and
said group having a pair of outer disk members with a maximum radius, and at least one disk member axially interleaved between said outer disk members and having a smaller radius than said outer disk members and a pair of minimum radii disk members with radii less than the radius of said one disk member respectively axially interleaved between said outer and said one disk member for enhancing axial selection of any one of said flexible disks in said group.

2. The assembly set forth in claim 1 wherein said minimum radius disks are axially alternately disposed on said support with disks of other than said minimum radius.

3. A flexible disk assembly, including in combination:
a center support;
a plurality greater than three of circular record indicia type disks coaxially disposed on said support;
said disks having different radii between a maximum radius and a minimum radius and at least one disk having an intermediate radius greater than said minimum and less than said maximum radius; and
axially alternate ones of said disks having said minimum radius.

4. The assembly set forth in claim 3 having three disks axially interleaved between each two of said disks with said maximum radius and which are axially adjacent and two of said three disks having said minimum radius.

5. The assembly set forth in claim 3 having a pair of axially spaced-apart ones of said maximum radius disks;
a first one disk having a radius next to maximum and axially spaced centrally between said pair of maximum radius disks; and
a pair of second one disks having a second next to maximum radius and axially spaced centrally between said first one disk and said pair of maximum radius disks.

6. The assembly set forth in claim 5 further including a plurality of said pairs of maximum radius disks wherein said plurality less one of said maximum radius disks are in two axially adjacent pairs and each said disk having a radius either greater than or less than both axially adjacent ones of said disks.

7. The assembly set forth in claim 3 having a plurality greater than three disks between any two most axially adjacent minimum radius disks, a plurality of said one disks axially interposed between said any two maximum radius disks with differing radii and being axially symmetrically disposed in accordance with said differing radii.

8. A flexible disk assembly, including in combination:
a center support;
a plurality of record indicia type circular disks coaxially disposed on said support, different ones of said disks having at least three different radii; and
a plurality of minimum radius disks axially alternatively disposed with disks having other than said minimum radius.

9. The assembly set forth in claim 8 wherein said disks having other than said minimum radius have an increasing axial spacing from like radius disks in accordance with increasing radius for all disks axially intermediate and up to, but not including, disks having a maximum radius whereby the greater the radius, the greater the axial spacing from a disk having a like radius between any two of said maximum radius disks.

10. The assembly set forth in claim 8 having plural sets of disks of different radii with disks in each set of disks being axially spaced an equal axial distance with some greater radii disks having a greater axial spacing than lesser radii disks and some of said greater radii disks of different sets having identical spacings and said sets each having disks that are axially interleaved.

11. A flexible disk assembly, including in combination:
a center support;
a plurality of record indicia type circular disks coaxially disposed on said center support;
a plurality of first ones of said disks each having a maximum radius;
a first plurality of second ones of said disks each having a minimum radius and a smaller plurality than said first plurality of said second one disks axially interleaved between two of said first one disks; and
a plurality of third ones of said disks each having a radius intermediate said minimum and maximum radii and axially interleaved between said first one disks and including at least one of said third one disks axially disposed between any two of said first one disks.

* * * * *

UNITED STATES PATENT OFFICE
CERTIFICATE OF CORRECTION

PATENT NO. : 3,931,645
DATED : January 6, 1976
INVENTOR(S) : Paul D. Dodd and Donald E. Griffiths It is certified that error appears in the above-identified patent and that said Letters Patent are hereby corrected as shown below:

Column 9, line 45, "minimum" should read --maximum--.

Signed and Sealed this thirteenth Day of April 1976

[SEAL]

Attest:

RUTH C. MASON
Attesting Officer

C. MARSHALL DANN
Commissioner of Patents and Trademarks